(12) United States Patent
Noble et al.

(10) Patent No.: US 6,622,148 B1
(45) Date of Patent: Sep. 16, 2003

(54) INTERACTIVE VIDEO TITLE SELECTION SYSTEM AND METHOD

(75) Inventors: Taber B. Noble, Baskin Ridge, NJ (US); Patrick J. Donoghue, New York, NY (US); Christopher J. Hough, Wilton, CT (US)

(73) Assignee: Viacom International Inc., New York, NY (US)

( * ) Notice: Subject to any disclaimer, the term of this patent is extended or adjusted under 35 U.S.C. 154(b) by 1194 days.

(21) Appl. No.: 08/735,619

(22) Filed: Oct. 23, 1996

(51) Int. Cl.[7] ............................................... G06F 17/00
(52) U.S. Cl. ..................... 707/104.1; 707/102; 345/700
(58) Field of Search ................................ 707/102, 104, 707/104.1, 100; 345/700

(56) References Cited

U.S. PATENT DOCUMENTS

| | | | |
|---|---|---|---|
| 4,859,187 A | | 8/1989 | Peterson |
| 5,031,937 A | | 7/1991 | Nellhaus |
| 5,065,347 A | | 11/1991 | Pajak et al. |
| 5,123,088 A | | 6/1992 | Kasahara et al. |
| 5,191,645 A | | 3/1993 | Carlucci et al. |
| 5,283,864 A | | 2/1994 | Knowlton |
| 5,297,253 A | | 3/1994 | Meisel |
| 5,317,686 A | | 5/1994 | Salas et al. |
| 5,317,687 A | * | 5/1994 | Torres ......................... 345/349 |
| 5,379,421 A | | 1/1995 | Palazzi, III et al. ......... 707/104 |
| 5,388,197 A | | 2/1995 | Rayner |
| 5,504,896 A | | 4/1996 | Schell et al. ................. 345/327 |
| 5,517,257 A | | 5/1996 | Dunn et al. .................. 348/734 |
| 5,557,724 A | * | 9/1996 | Sampat et al. ............... 345/157 |
| 5,559,949 A | | 9/1996 | Reimer et al. ............... 345/327 |
| 5,594,661 A | | 1/1997 | Bruner et al. .......... 395/200.49 |
| 5,671,381 A | * | 9/1997 | Strasnick et al. ............ 345/355 |
| 5,682,486 A | * | 10/1997 | Grossman et al. .......... 345/339 |
| 5,689,663 A | * | 11/1997 | Williams ..................... 345/327 |
| 5,737,527 A | * | 4/1998 | Shiels et al. ............ 395/200.47 |
| 5,745,710 A | * | 4/1998 | Clanton, III et al. ............ 348/7 |

OTHER PUBLICATIONS

Evan Schwartz, People Are Supposed To Pay For This Stuff?, Wired, Jul. 1995, pp. 148–153, 187, 190–191.
Janine Solal, Yorb: Electronic Neighborhood, Morph's Outpost, Apr. 1995, pp. 34–36.
Joe Dysart, Wall Street Meets VR: Animated Investment Tracking, Virtual Reality World, Sep./Oct. 1994, pp. 22–25.
David Frerichs, Bringing Real Applications to the Virtual Environment, Virtual Reality World, Jul./Aug. 194, pp. 50–54.
CompuServe Magazine's Tip Sheet, See It, Hear It, A Lood at Essential Sound and Graphics Utilities, date unknown.
PCT Internatiol Search Report mailed Feb. 6, 1998.

* cited by examiner

*Primary Examiner*—Greta Robinson
(74) *Attorney, Agent, or Firm*—Venable, LLP; James R. Burdett; Ralph P. Albrecht

(57) ABSTRACT

An system and method for interactively choosing a selection from a database, including a media database containing movies, videos and graphical offerings, is disclosed. The invention uses a physical metaphor to represent the database and icons to represent selections. A preferred embodiment for a video-on-demand environment uses a globe or torus to represent a video database, which is displayed on a user's television at the user's location. Superimposed on the globe is a grid of pictorial icons representing the video selections stored in the video database. The video selections are arranged by category and alphabetically on the globe. The user may employ a remote control to issue search commands.

41 Claims, 16 Drawing Sheets

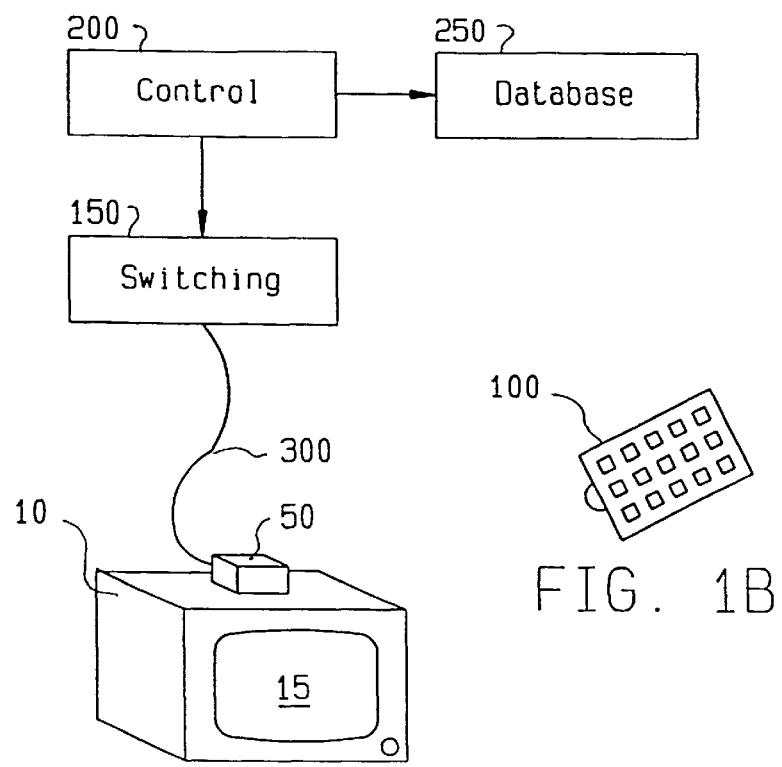
FIG. 1A
FIG. 1B
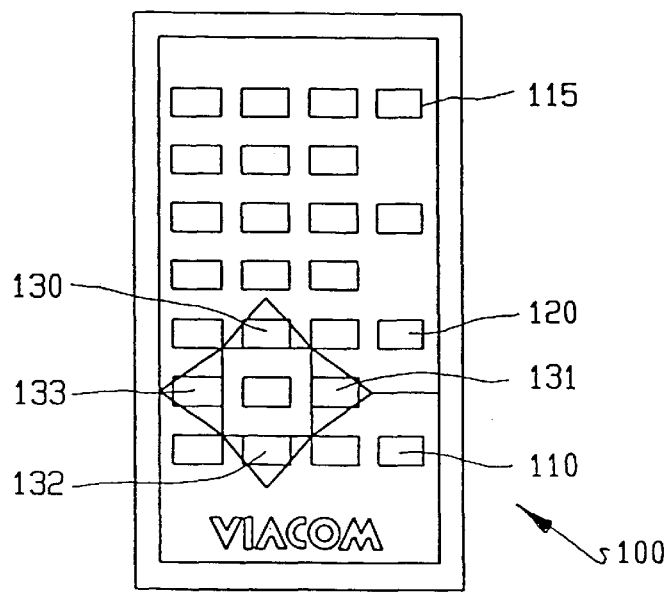
FIG. 2

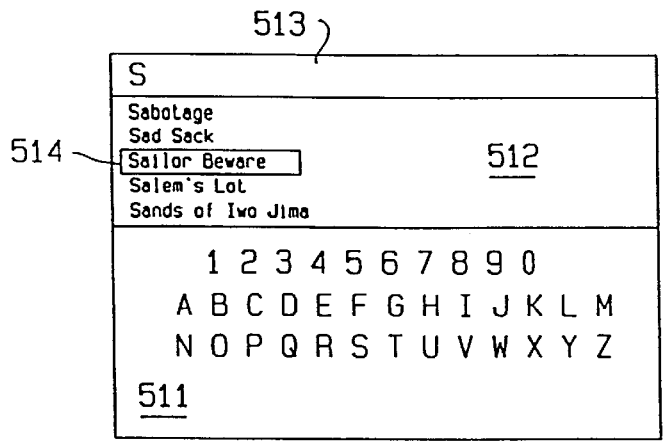
FIG. 8A
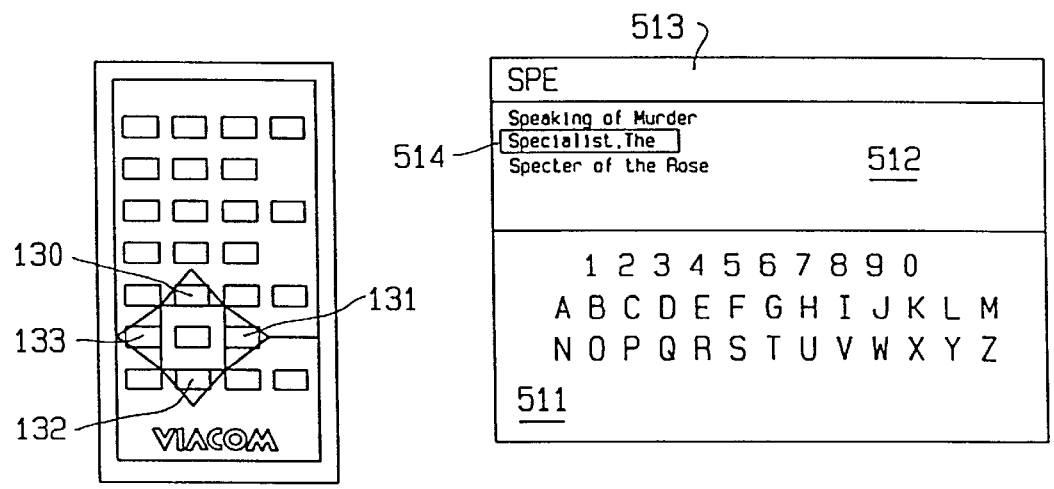
FIG. 8D
FIG. 8B
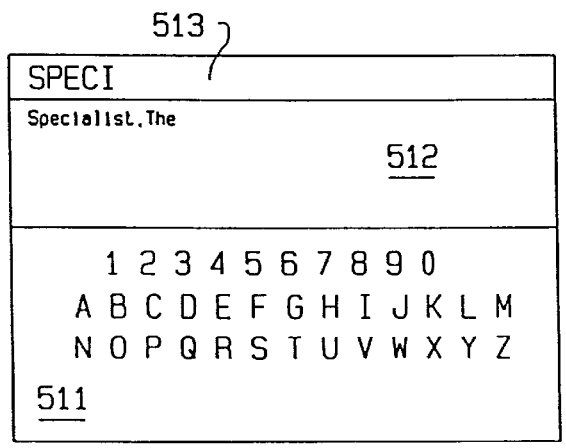
FIG. 8C

INTERACTIVE VIDEO TITLE SELECTION SYSTEM AND METHOD

FIELD OF THE INVENTION

This invention relates to a system and method for providing a graphical interface for a computer database, and, more particularly, to a system and method for interactively accessing a database including a media selection database storing movies, videos and graphical offerings.

BACKGROUND OF THE INVENTION

As television and other video-based media move from the current pre-programmed regime to a video-on-demand regime, conventional methods for program selection like printed television guides, pay-per-view telephone selection, television programming grids and hierarchies of menus are becoming obsolete.

Available video titles stored in a database are likely to be constantly changing as new offerings are added and old offerings are deleted. This constant turnover makes it difficult and expensive to inform users of the current offerings, for example, by providing every subscriber with an updated, printed list of video selections at regular intervals.

Similarly, it is impractical to list a large number of available titles on the screen and ask the subscriber to make a selection for viewing due to the difficulty of finding particular movies in such a list. In addition, such an extensive listing makes it impossible, as a practical matter, to provide background information on the available titles.

Grid displays, sometimes conveniently used on television, are also inconvenient to use because they are not interactive. For example, a user must wait for a grid to scroll through all the lower channel offerings before being informed of what is available on the highest channel. Also, presently employed interfaces for video offerings use pre-programmed materials in the sense that they list all video offerings available from a given service and do not adjust according to user's viewing habits.

A conventional way of providing interactive access to information is by a sequence of menus and submenus. In theory, media selections, including movies, video and graphical offerings, can be organized by categories and be accessible using a traditional hierarchy of menus. But such menu-driven schemes are not intuitive and would likely aggravate users, who would be required to struggle with a multi-level menu-driven search scheme.

Accordingly, it is desirable to provide a new interface for searching a database of media selections so as to advise users of available selections in a rapid, pictorial, intuitive and easily accessible manner.

Such a new interface is needed not only for television applications, such as video-on-demand and pay-per-view, but also for other video-based media applications such as computer media services, whether available on a stand-alone computer or over a network. These other computer applications also suffer from the lack of an intuitive interface for navigating among a rapidly growing universe of media selections.

SUMMARY OF THE INVENTION

The present invention provides an intuitive and easy-to-use interface for searching a computer database. The preferred embodiment provides a video-on-demand system for interactively choosing a video offering from a movie database stored in at least one computer system.

Individual video offerings from the movie database are represented by pictorial icons that can be displayed on a user's television or monitor. The interface uses a physical metaphor (e.g., a physical object such as a globe or a torus) to represent the database. The user perceives the organization of the database as represented by a collection of icons arrayed on such a physical object. The notion of a physical metaphor (e.g., a geometric object) in general is referred to as a virtual space having logical coordinates, where each item of information, such as a video offering, is assigned to a point on the logical coordinates. The logical coordinates are determined in accordance with each item's classification. A person skilled in the art will of course understand that this logical characterization is provided to explain the underlying concepts, and that the present invention relates to a physical computer designed to implement this conceptual view of the system as well as other objectives as described below.

In a preferred embodiment, the classifications include a subject category of movies (e.g., comedy) and the place of the first character of the title of the movie in the alphabet. A globe or torus is used as a physical metaphor where each video offering is assigned to a point on the globe or torus. The database is represented such that the system arrays pictorial icons corresponding to video offerings on a grid superimposed over the globe or torus. The video offerings may include movies, television programs, documentaries, music videos, educational programs, and the like.

The virtual space is, thus in this embodiment, is a globe or a torus where icons may be arrayed alphabetically by title along lines of longitude and by subject category along lines of latitude.

After having displayed the globe or torus metaphor to acclimate the user to the search protocol, the system of the preferred embodiment permits selecting a particular category and displays a limited number of offerings from that category. The system also displays at the bottom of the screen a navigator icon for showing the user his current "location" in the database. The user then reviews the pictorial icons on a monitor and interactively selects a desired video offering.

Once the system has displayed particular icons corresponding to available offerings, the search process begins. If a particular offering is of interest, the user can "highlight" the icon corresponding to that offering. When the user chooses to highlight an icon, the system provides an animation sequence for display on the user's television in which the highlighted icon grows in size and the remaining icons shrink in size. If a particular offering turns out to be not of interest the user can highlight another currently displayed icon corresponding to another offering. Once an icon has been highlighted, the user can preview the corresponding movie or video.

The system also records the user's viewing habits in order to present to the user the offerings in a manner that facilitates the selection process.

As indicated, the application of this invention is not limited to selecting video offerings on a television. For example, it can be used for selecting a video tape in a video rental store, or selecting data available on remote computers through a network such as the Internet. In fact, the invention can be adapted to any database to be interfaced by a user.

Thus, the method of this invention is for interactively accessing a database of selections, each having classifications, stored in at least one computer. This method includes the steps of representing at least a portion of the database with a geometric object corresponding to a virtual space having logical coordinates, wherein each selection is assigned to a point on the logical coordinates in accordance with its classifications, and displaying on a monitor pictorial icons representing some of the selections stored in the database in accordance with the logical coordinates.

BRIEF DESCRIPTION OF THE DRAWINGS

The objects and advantages of this invention will be apparent upon consideration of the following detailed description, taken in conjunction with the accompanying drawings, in which like reference characters refer to like parts throughout, and in which:

FIGS. 1A–B schematically depict components used in the implementation of the preferred embodiment.

FIG. 2 depicts a television remote control used as an input device in the preferred embodiment;

FIGS. 8A–D illustrate operation of the movie finder service;

DETAILED DESCRIPTION OF THE INVENTION

Figure 3:
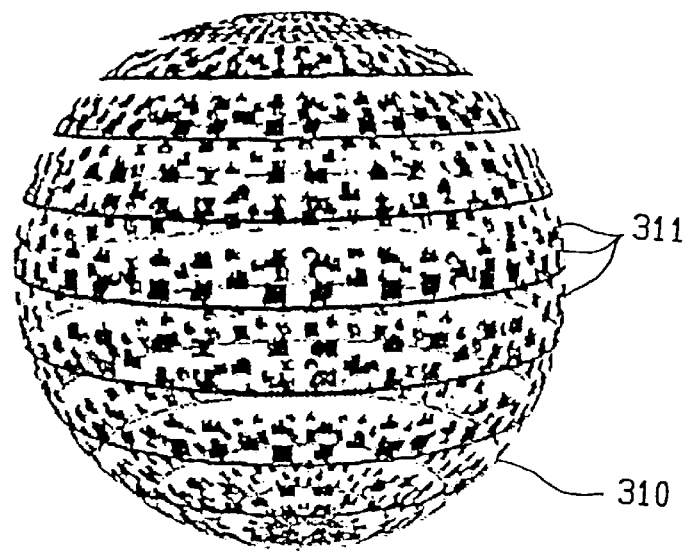
FIG. 3 depicts a globe metaphor on a display screen.

A. Components of the System of the Preferred Embodiment

The system of the preferred embodiment for interactively choosing movies and other video offerings from a database is depicted in FIGS. 1A–B. In this particular embodiment, the system is for a video-on-demand television application. It comprises a television 10, television set-top box ("controller") 50, remote control 100, remote switching 150, a control interface 200, and a movie database 250, which employs at least one computer that stores movies and other video offerings. The remote connection may be implemented by, for example, a fiber optic cable 300.

The set-top box 50 accepts and interprets commands from the remote control 100 and provides a communication with the movie database 250. The set-top box 50 transmits user selections to the movie database 250 through switching means 150 and control interface 200 and receives various control signals as well as data for display on the television 10, including the video selection data. The control interface 200, operated by a video-on-demand service provider, provides a user with various services, including presenting a search protocol, presenting transaction screen, and playing back a selected movie or other video offering. Also a media-element database, that stores media elements for updating the display screen in response to a user's input, is contained in the control interface input. The media elements include pictorial icons representing either services provided by the video-on-demand provider or movies or other video offerings available for selection. The media elements also include various screen windows and screen backgrounds. Presentation of a sequence of media elements is referred to as an animation sequence. It should be noted that various video-on-demand systems have been extensively described in the technical literature and are well-known in the art.

Remote control 100, used for interacting with the set-top box 50, can be a conventional infrared remote control. In the preferred embodiment, seven buttons are used on the remote control, as depicted in FIG. 2. A first button 115 is used simply to establish a connection with a video-on-demand service provider. Four of the buttons 130–133 are preferably arrayed at the points of the compass. Two additional buttons are "choice" 110 and "select" 120 buttons. In other embodiments, different buttons may be selected to perform the functions of the buttons in FIG. 2.

B. Architecture of the Interface and Search Protocol

Once the user establishes a connection with a video-on-demand service provider by depressing the first button 115, the control interface 200, which includes the computer software of the invention, generates a "globe" metaphor 310 for display on the user's television screen 15 as depicted in FIG. 3. Objects 311 on the globe symbolically represent the organization of available video offerings in the movie database 250. Globe metaphor 310 introduces and prepares the user for the search protocol implemented by this invention. Individual video icons are arrayed alphabetically by title along lines of longitude and by subject category along lines of latitude. In searching the movie database, the user will virtually "fly" over the surface of the globe and view icons that comprise the surface of the globe. The globe serves as a particular "virtual space" having logical coordinates where each item of information, such as a video offering, is assigned to a point on the logical coordinates in accordance with its classifications. For example, a comedy movie with a title starting with "a" is assigned to a point on the logical coordinates of "comedy" and "a."

Figure 4:
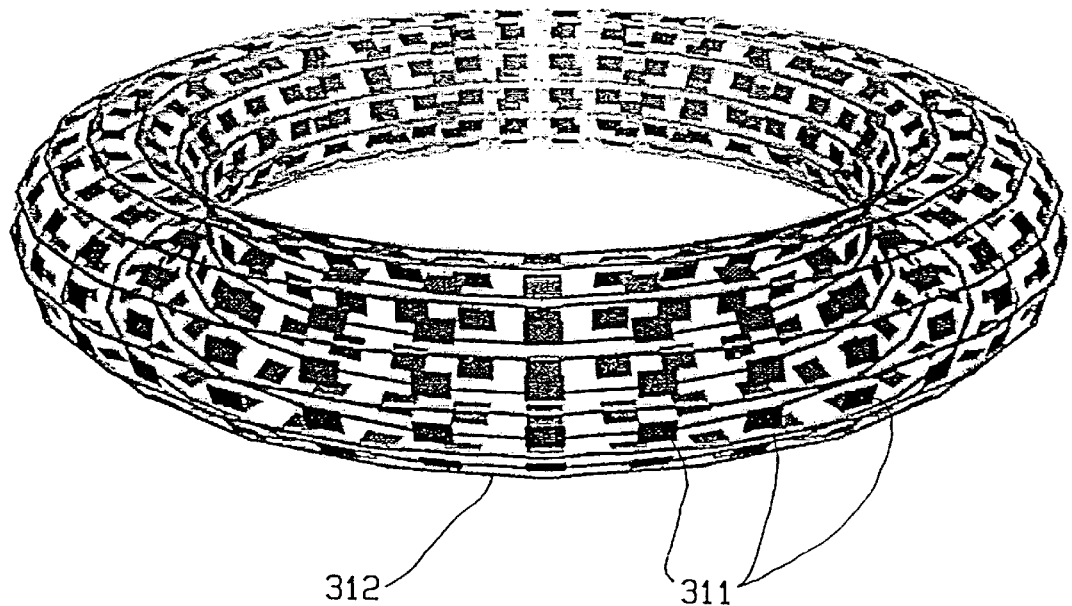
FIG. 4 depicts.a torus metaphor on a display screen.

Another physical metaphor which can serve as a virtual space is a torus (a "doughnut" shape) as displayed in FIG. 4, where horizontal connections represent subject categories of videos arrayed alphabetically within each category. Similar objects 311 represent organization of the available selections from the movie database and comprise the torus 312.

Figure 5:
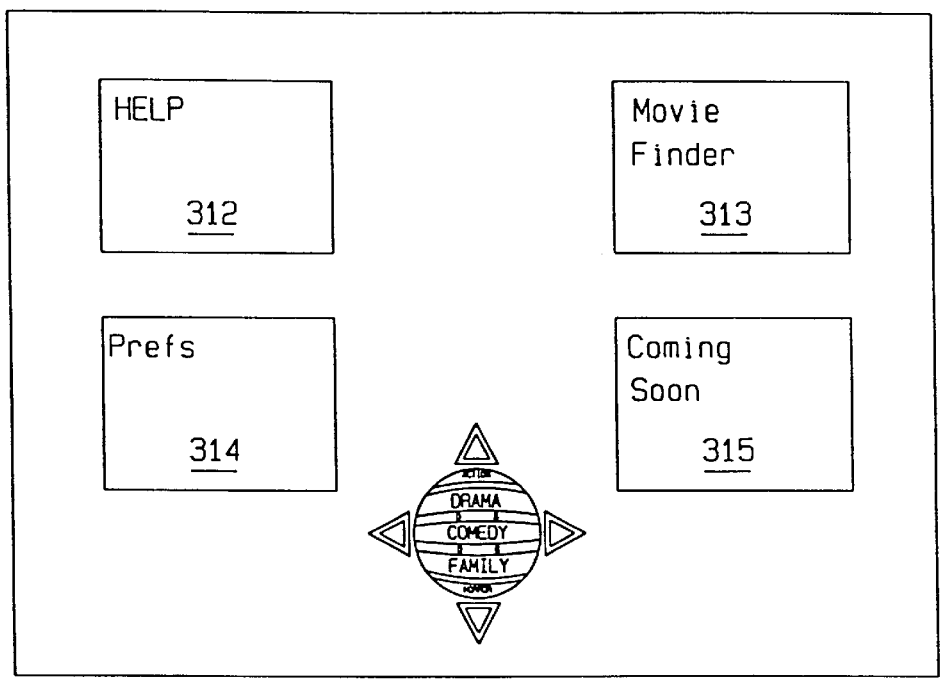
FIG. 5 depicts four icons on a display screen corresponding to available services.

After the globe 310 has been displayed, the user can either proceed to a pictorial search according to the search protocol, or to four additional services provided by the system of this invention. If the user selects the additional services, the control interface 200 generates a new screen as depicted in FIG. 5 for display on the user's television 10. The new screen includes four icons corresponding to four available services, which are "help" 312, "movie finder" 313, "preferences" 314 and "coming attractions" 315.

Figure 6:
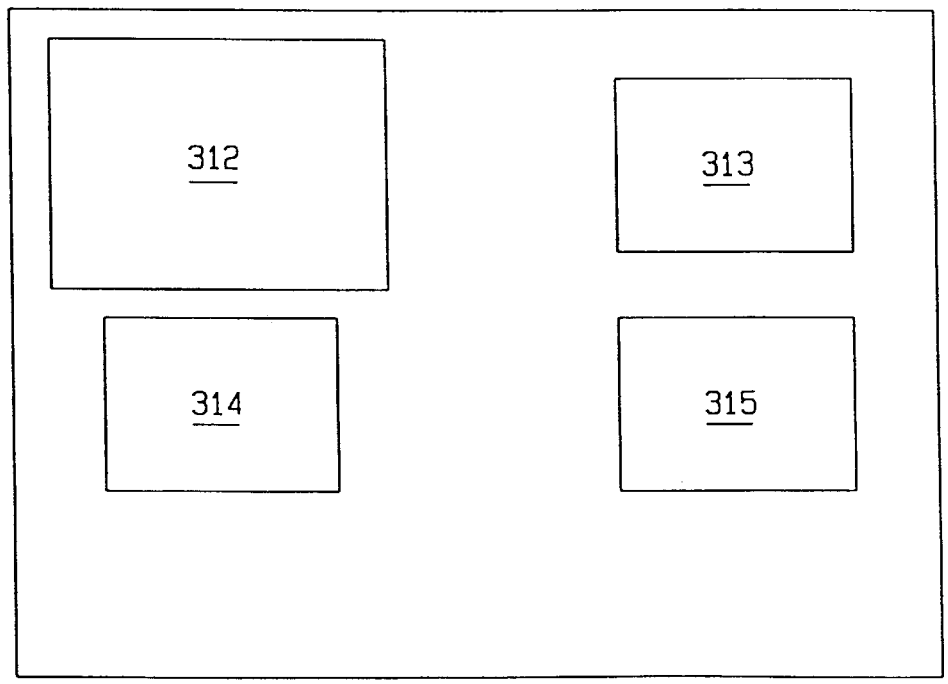
FIG. 6 depicts a display screen of FIG. 5 showing a highlighted service icon.

Using the "choice" button 110 the user can "highlight" one of the icons corresponding to one of the services. In response to pressing the "choice" button, an infrared command is sent by the remote control 100 and received by the set-top box 50. Then, the set-top box 50 issues signals to the control interface 200 which summons programmed animation sequences for display on television 10. In the animation sequence that "highlights" the icon the highlighted icon grows in size and occupies a larger portion of the screen. The other icons simultaneously shrink in size and occupy a smaller portion of the screen. The end result of this sequence is shown in FIG. 6, where the "help" icon 312 has been "highlighted" and therefore has grown to occupy a larger portion of the screen 15. If the user continues to press the "choice" button other icons are sequentially "highlighted" in the same manner. The icons are highlighted in a clockwise sequence.

Once the user has highlighted a particular service icon, the user can select that service by depressing the "select" button 120. When the control interface 200 receives a "select" command, it retrieves the video material associated with that particular option and transmits it for display on the user's television 10. For example, once the "Help" feature has been selected, the service would transmit a preprogrammed "help" video that would explain how to use the service.

Other available services are movie finder 313, preferences 314, and coming attractions 315. The coming attractions service 315 displays a prerecorded preview of video offerings soon to be added to the movie database but which are not currently available. Preferences 314 can be used to implement a number of different services. For example, the preference feature could implement an interactive method for specifying payment for use of the service, e.g., charging to a credit card number. Alternatively, the user could inform the service of her favorite offering categories and searches could be limited to these categories. Finally, the preference feature could implement a parental lock-out feature.

Figure 7:
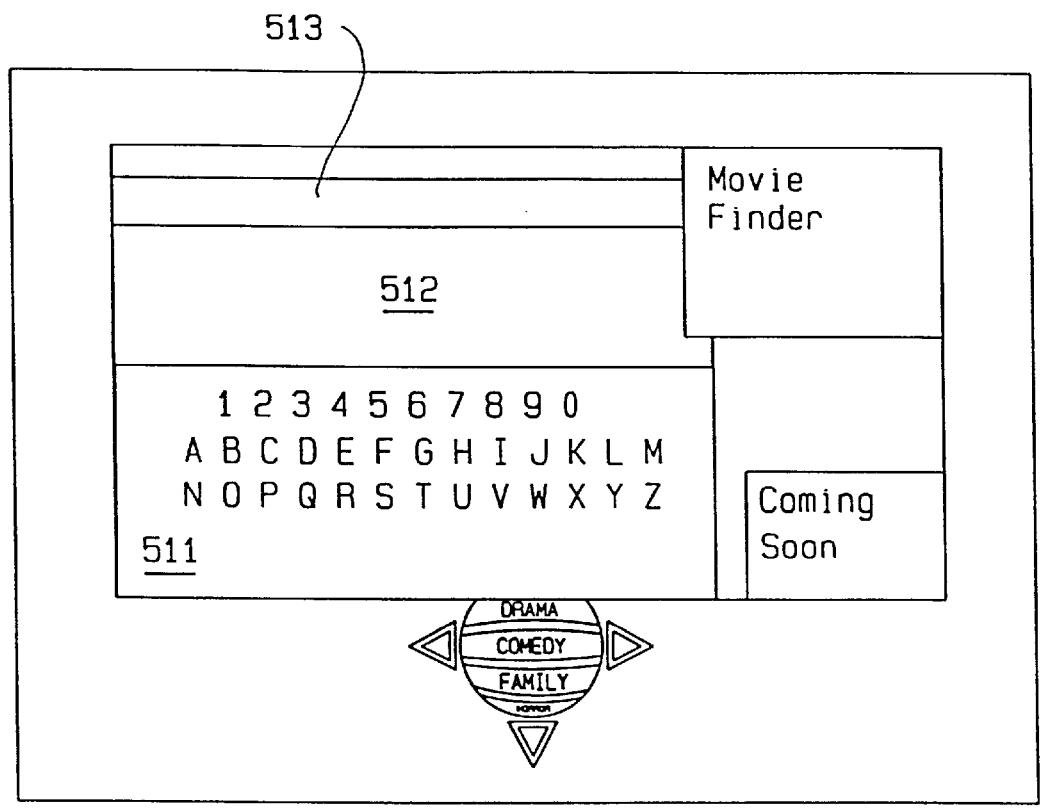
FIG. 7 depicts a display screen displaying the movie finder service.

The movie finder service 313 is a text-driven search scheme which complements the icon-driven search scheme of the preferred embodiment, employing a physical metaphor such as a globe or torus. When the movie finder service is selected, three screen elements as shown in FIG. 7 are displayed on the user's television—a virtual keyboard 511, a title entry window 513, and a title display window 512. Using four compass keys 130–133 and the "choice" key 110, the user highlights letters on the virtual keyboard for entry in the title entry window 513 in much the same manner as highlighting service icons, except that as a letter is highlighted it is entered in the title entry window 513. The process of title entry is depicted in FIGS. 8A–C. Once an initial letter is entered, a partial listing of movies starting with that letter is displayed in the title display window 512. As the user enters more letters the control interface 200 updates the list to show the offerings with titles beginning with the entered letter sequence as shown in FIG. 8B. If the user desires, the user can spell out the entire movie name. Alternatively, when enough letters are entered so that the sought-after title appears in the title display window the user can make a transition to that window to continue the search by using the "north" key 130.

As indicated the user can employ the title display window to choose movies for review and possible selection. When the user is in the title display window, the user can use the "north" 130 and "south" 132 keys to move up and down the list alphabetically. After each depressing of one of these keys the control interface 200 moves a light bar 514 onto a new title. A light bar is a region surrounding the title that appears brighter than the rest of the title display window 512. If the user wishes to move beyond the last displayed title, the control interface 200 provides an updated list for display. If the user desires to see preview material associated with the particular movie being highlighted, the user can press the "select" button 120. When the program receives the "select" button request, it makes a transition to a new portion of the program by displaying the pictorial icon of the movie currently highlighted and three other icons corresponding to the offerings with titles that are alphabetically closest to the highlighted movie. The preview material associated with the selected movie is then displayed on the screen. If the offering is not of interest, the user can continue the search using the pictorial search, which will now be described. It will be noted that the user could have entered the pictorial search (or browse) system immediately after connecting to the service by bypassing the service menu.

Figure 9:
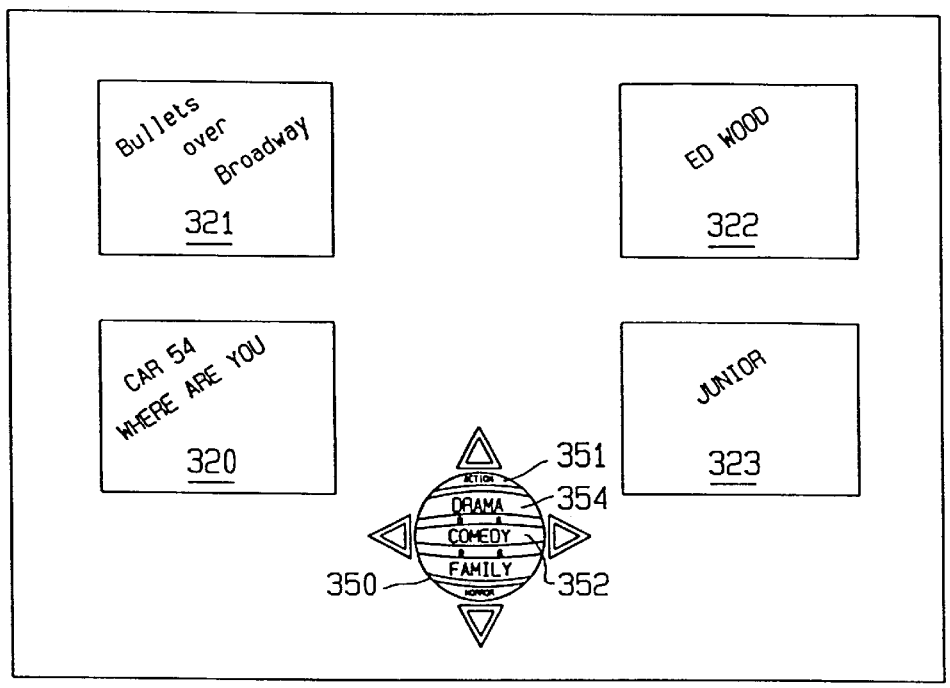
FIG. 9 depicts an image on a display screen showing four pictorial icons corresponding to video offerings available for viewing and a navigator icon indicating user's location in the virtual space representing a database.

If the user enters the pictorial search system immediately after connecting to the service the globe in FIG. 3 is displayed. Then the control interface generates a new screen for display comprising four pictorial icons corresponding to available video offerings as depicted in FIG. 9. Alternatively, if the user had entered the pictorial search routine from the movie finder 315 service the screen in FIG. 9 would have been displayed immediately. Entries 320–323 belong to a particular category of movies, for instance, "comedy".

The control interface also generates a navigator icon 350 for display on the bottom of the screen. The central band of the navigator icon 350 shows the category the user is currently searching, "comedy" 352. By clicking the north button 130, the user can move from the "comedy" category to the next category, e.g. "drama" category 354, and by clicking the "south" button 132 the user can move to the "family" category 350. By clicking the "east" 131 or "west" 133 buttons the user can move either up the alphabet or down the alphabet to view other offerings in the comedy category 352. After each depressing of an "east" 131 or "west" 133 compass button, the control interface provides an animation sequence for display on the user's television in which four icons slide to new positions on the screen, four icons slide off the screen, and four new icons are displayed on the screen. Alternatively, after each depressing of a "north" or "south" compass key, the control interface provides an animation sequence for display on the user's television in which four icons from a new category slide onto the screen, and the four originally-displayed icons of the old category slide off the screen.

Figure 10:
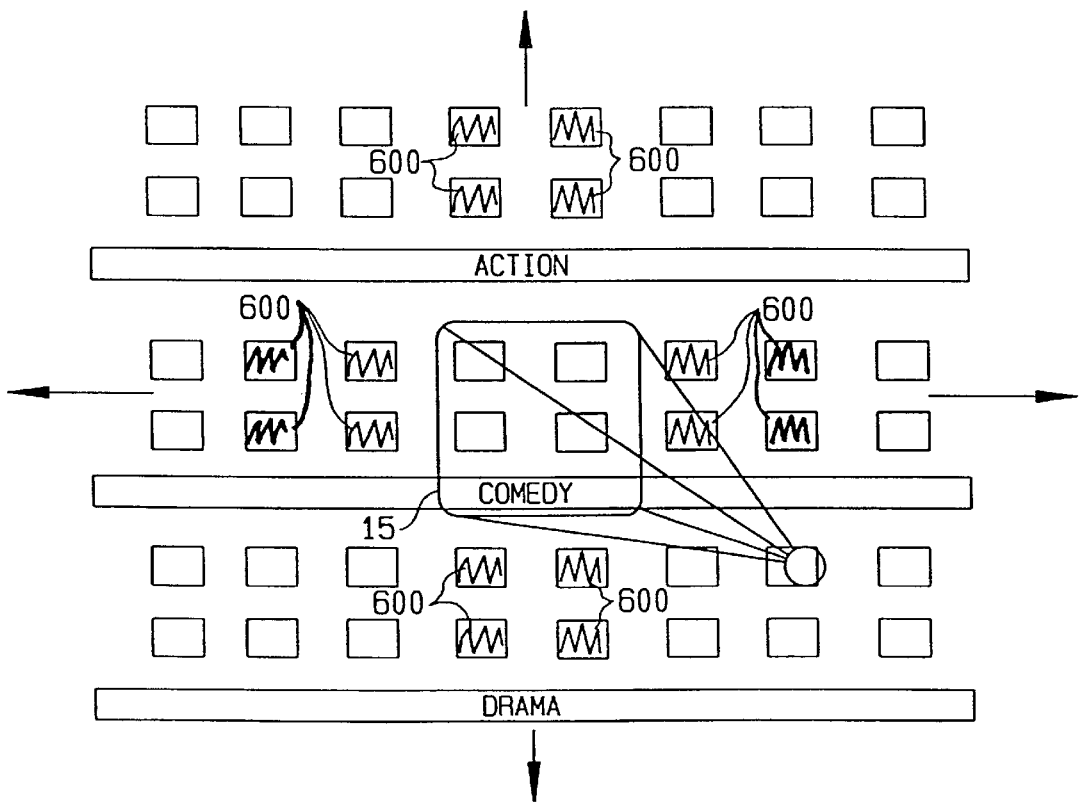
FIG. 10 symbolically illustrates search methodology.

Although a globe is used to represent the movie database, for the purposes of understanding the search protocol it is easier to envision the search as being of a two dimensional grid as depicted in FIG. 10. In this grid rows and columns wrap around so that any last element is adjacent to a first element in a given row or column. The icons extend in two dimensions and by depressing the compass keys the user selects either the next two or four icons from those labeled 600 to be displayed on the television screen 15. The user is essentially steering a "window" across the grid. If the user makes a transition to a new category, the system displays four movie icons having titles that are located in the same location of the alphabet as the four previously displayed icons. In this manner, as the user makes transitions from category to category the user is always searching the same location in the alphabet.

Figure 11A:
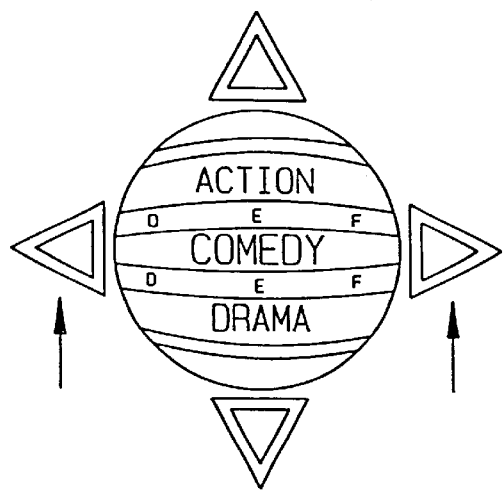
FIGS. 11A–D show a more detailed view of the navigator icon depicted in FIG. 9, illustrating the manner in which the navigator icon is animated to operate in synchronism with user's searching pattern.
Figure 11B:
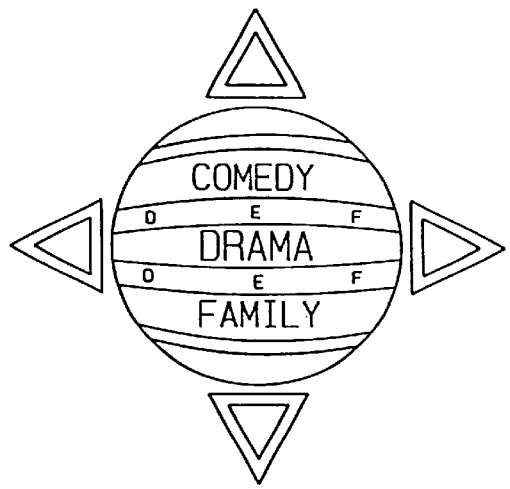
Figure 11C:
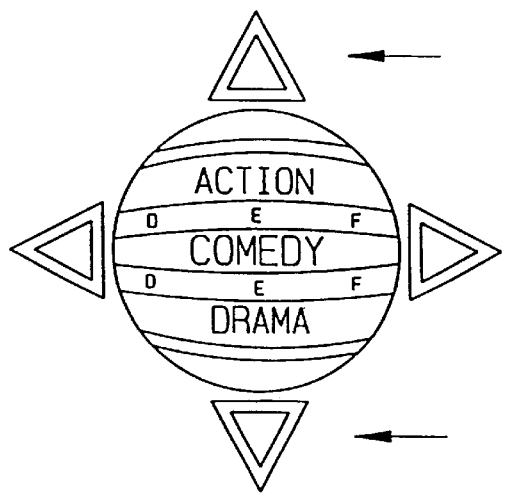
Figure 11D:
Figure 12A:
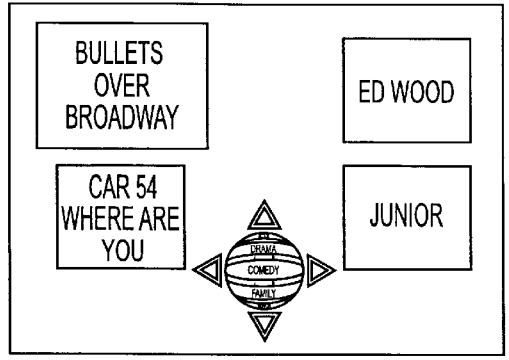
FIGS. 12A–D depict the operation of the highlighting feature.
Figure 12B:
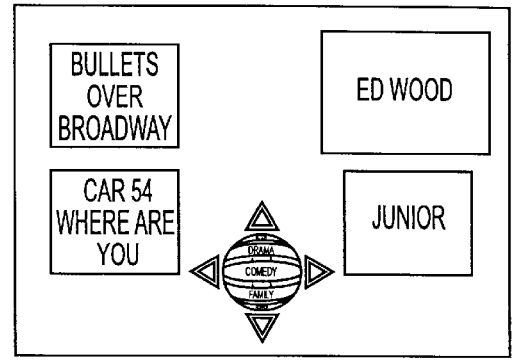
Figure 12C:
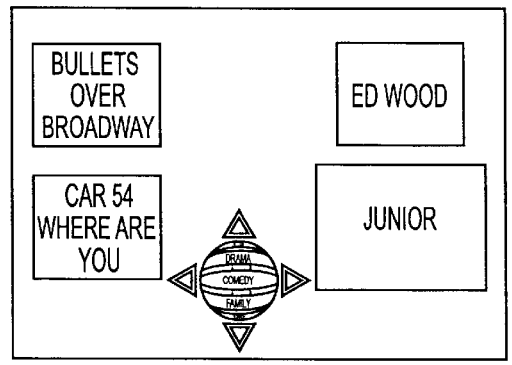
Figure 12D:
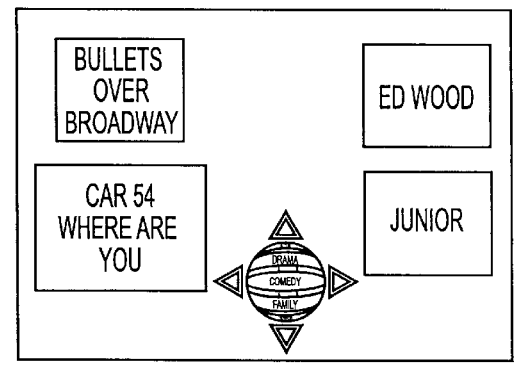

As indicated, the control interface also displays on the same screen a navigator icon 350 shown in FIG. 9 which is programmed to track the user's current viewing activity so as to indicate to him where he is with respect to movie categories and alphabetically as illustrated in FIGS. 11*a–d*. For example, FIGS. 11A–B illustrate the operation of the icon during user's transition from the "comedy" category to the "drama" category. During this transition the navigator icon simulates rotation upward so that the drama label would rotate into the center of the icon replacing the comedy label. The central portion 351 of the icon appears brighter, indicating that the user is now searching for video offerings in the "drama" category 353. Likewise, in between the categories a legend 354 is displayed on navigator icon 350 indicating the portion of the alphabet currently being searched. As shown in FIGS. 11C–D, as the user moves up the alphabet, the navigator icon simulates rotation from right to left, depicting offerings with titles starting with letters later in the alphabet; and as the user moves down the alphabet the legend would "rotate" from left to right.

The navigator icon thereby performs the useful function of indicating to the user the current category being searched, as well as the current location of titles in the alphabet. This icon helps intuitive searching by coordinating with the globe by continuously mapping the position of the user within the movie database.

Figures 13, 14:
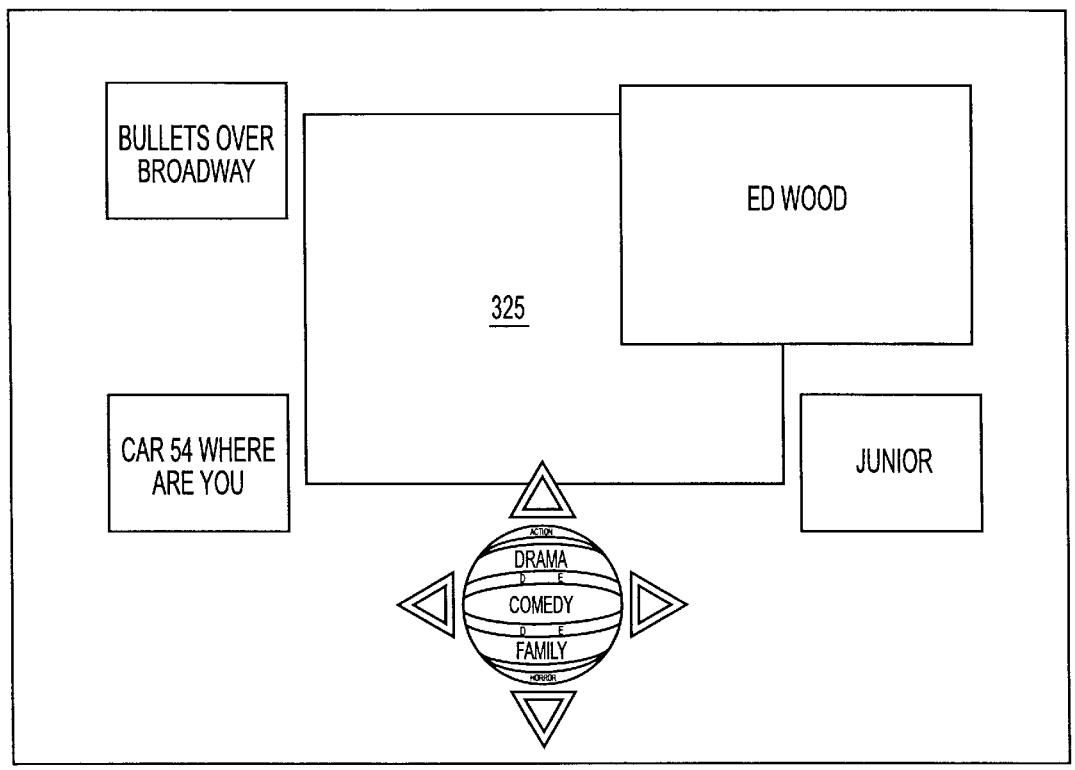
FIG. 13 depicts the final image of an animation sequence used to present preview material.
FIG. 14 depicts a payment screen.

When the user finds a offering that is of interest on a given screen, the user can preview the offering by using the following two-step process. First, by clicking the "choice" button 110, the user highlights a particular video offering. When the user has highlighted the offering, the icon grows in size and the other movie icons on the same screen shrink in size. A clockwise highlighting of icons is shown in FIGS. 12A–D. If the user is interested in viewing preview material for a highlighted offering, the user can press the "select" button 120, and the system of this invention plays preview material for the user as shown in FIG. 13. The preview material is played in a screen area 325 added to the display. This preview material can include casts of characters, trailers, previews, cast interviews and reviews. If the user wishes to order and view the highlighted offering, the user can again press the "select" button 120 at any time while the previews are playing. At this time, a new screen appears as shown in FIG. 14 which polls the user for payment information. For instance, the system may poll the user for his credit card number. After the user has specified his payment method using his remote control 100 and the virtual keypad 710, the user can press the "select" button 120 again to begin viewing the selected video title.

If after viewing the preview material the user decides not to view the highlighted offering, or at any time during the preview material the user decides not to view the highlighted offering, by pressing the "choice" button 110, the user can highlight another icon corresponding to a different video offering and preview that video offering. If the user enters no command, the preview material for each of the icons currently displayed will be played back in sequence.

Also, the user can at any time move the display "window" to other sections. The user can move up or down the alphabet by pressing the "east" 131 or "west" 133 buttons to search new offerings in the same category, or move to a new category by pressing the "north" 130 and "south" 132 buttons. Once the user has decided how to proceed, and has pressed buttons, new offerings will be presented. If the user wishes to view preview material or to make a particular selection, the user can use the "choice" 110 and "select" 120 buttons in the manner previously described.

C. Implementation of Software

1. General Description

Figure 15:
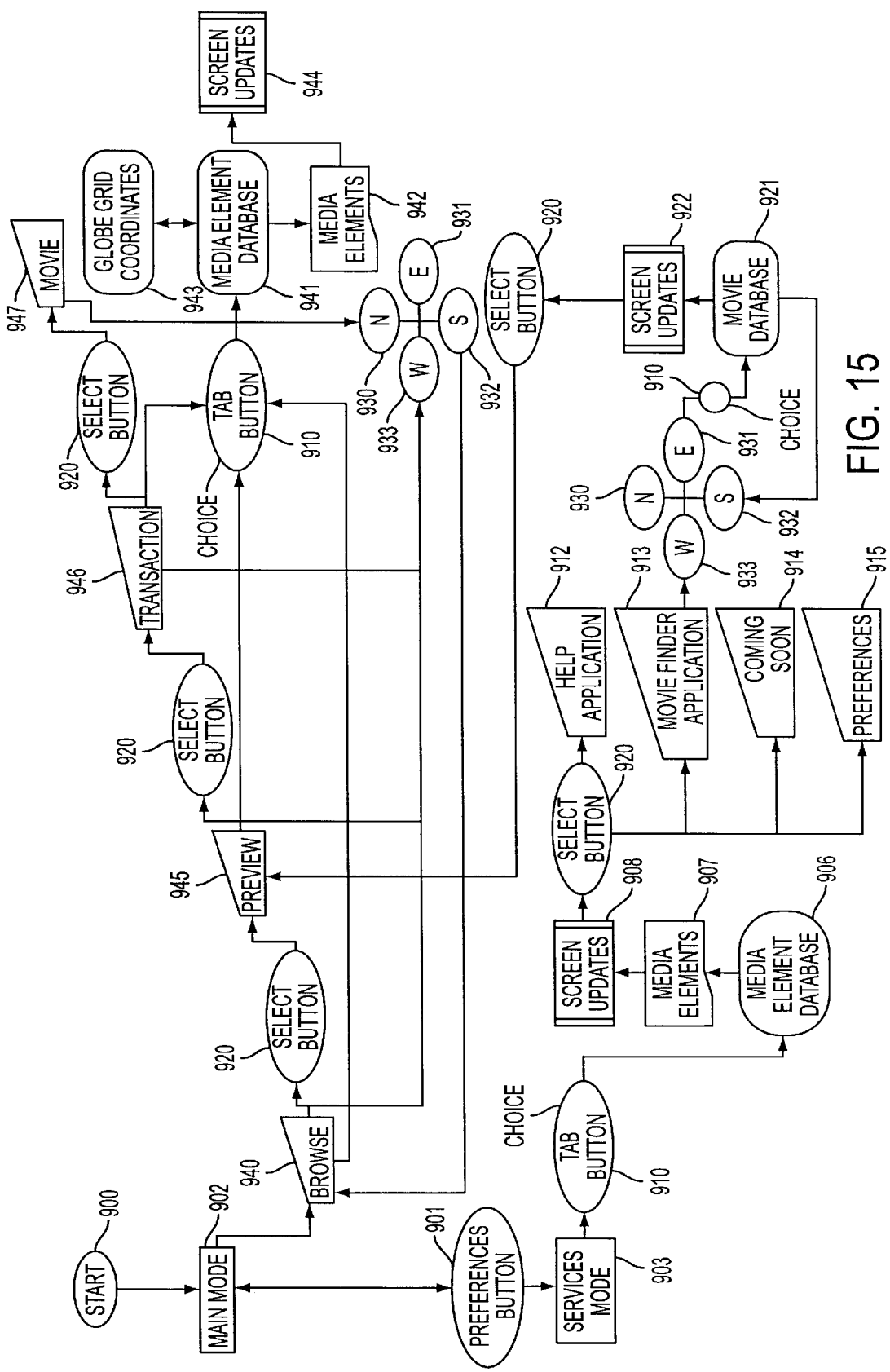
FIG. 15 shows a flowchart depicting the operation of the computer software used to implement the invention.
Figure 16:
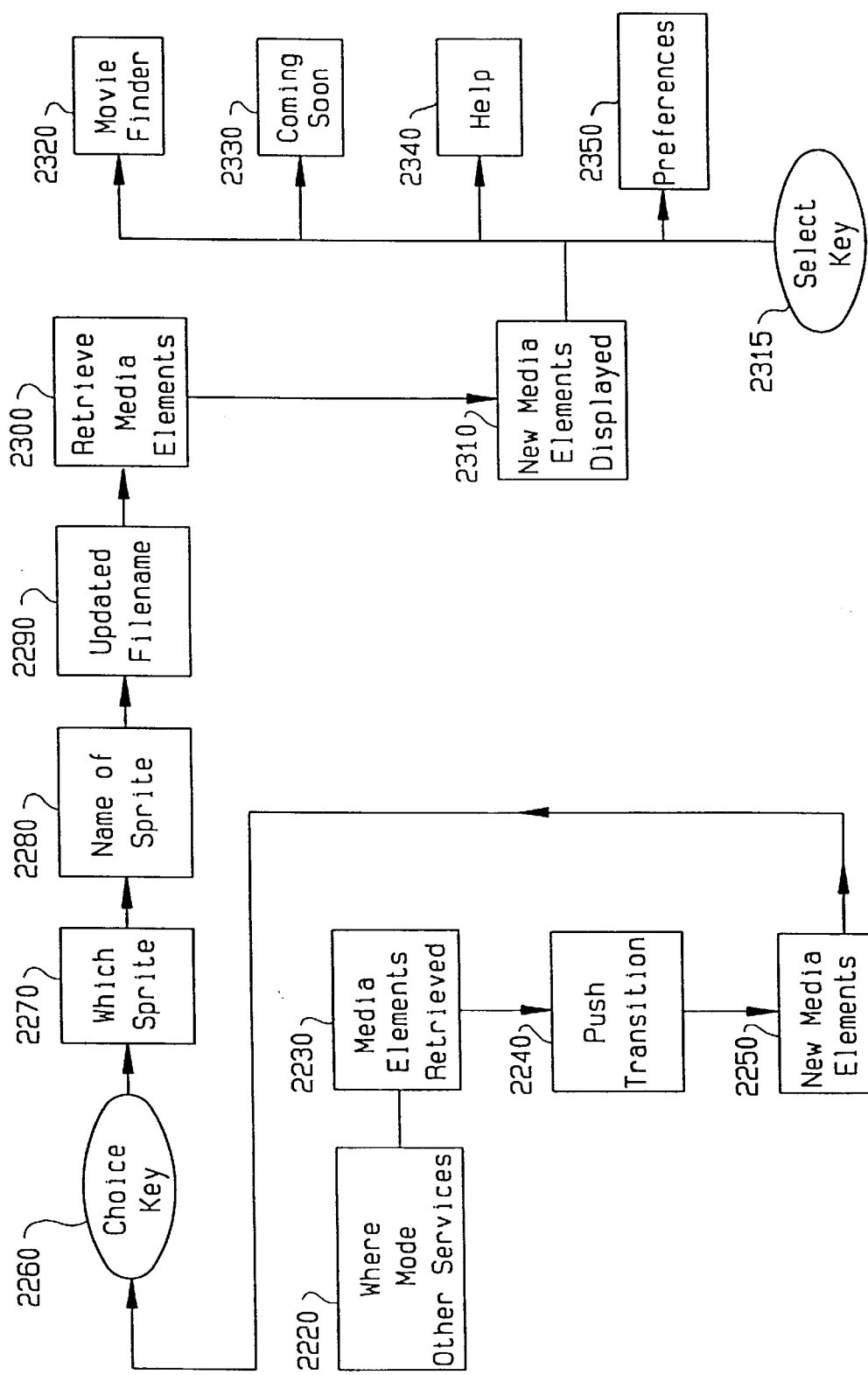
FIG. 16 is a flowchart depicting in detail the programming steps executed by a computer so as to implement the service feature.
Figure 17:
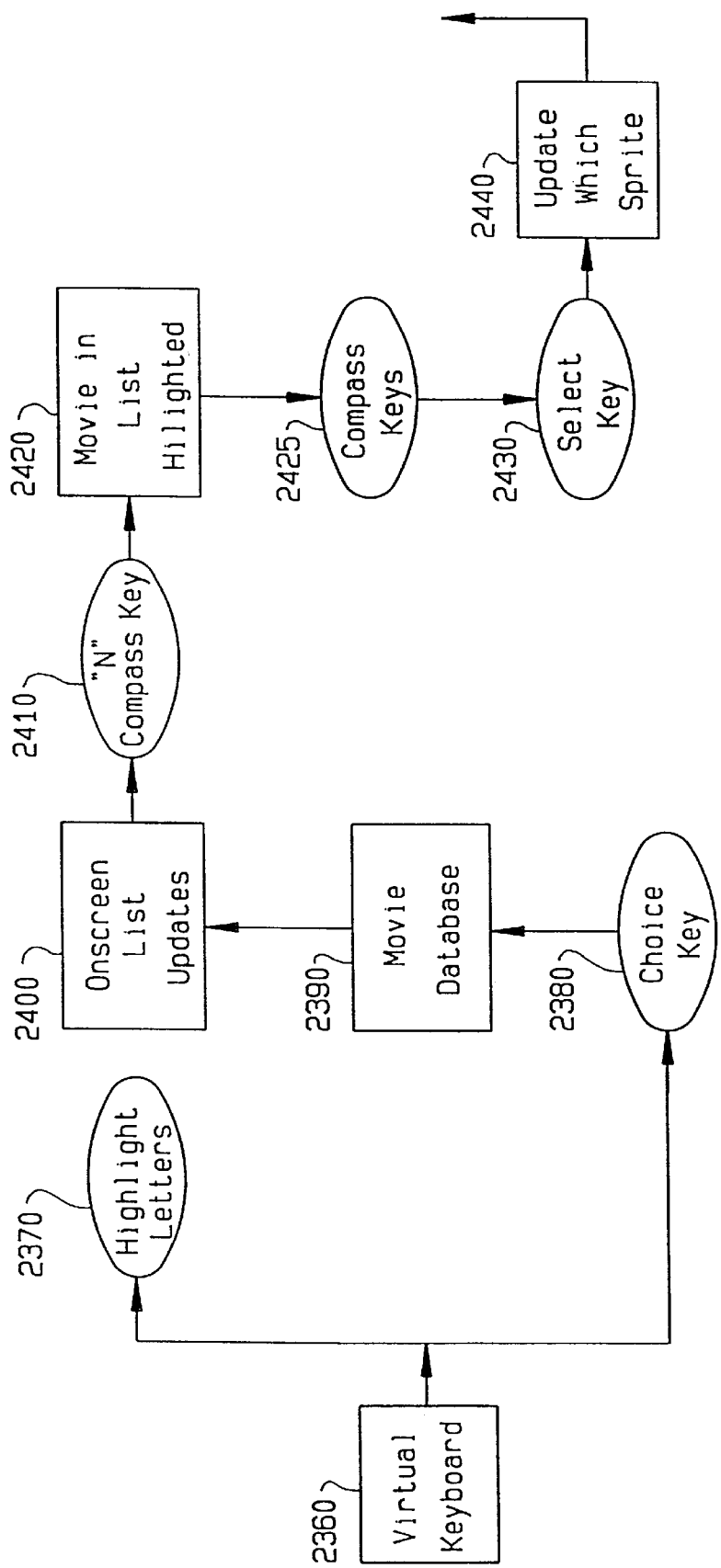
FIG. 17 is a flowchart depicting in detail the programming steps executed by a computer so as to implement the movie finder feature.

A flow chart detailing operation of the software of the preferred embodiment depicted in FIG. 15. After a communication has been established as shown at Start 900, the program enters main mode 902 which offers the user a choice to proceed immediately to the pictorial search routine starting at 940 or to the screen menu starting at 903.

The user can select the screen menu by employing the "choice" button 110, and if the user does so, the program executes a step shown at 903 to display the screen menu as depicted in FIG. 5. As described previously, to choose a service for use comprises a two-step process. First, the user "highlights" the icon corresponding to the desired service using the "choice" button 110. In response to a "choice" key entry the program executes a step at 910 whereby it retrieves the animation sequence corresponding to the "highlight" feature for display on the user's television. The program accomplishes this by retrieving media elements 907 corresponding to the animation sequence from a media database 906 stored within the control interface 200 and transmitting them as screen updates 908 to the user's television 10.

Once the user has highlighted the icon of his choice, the user may execute the second step to use the service by pressing the "select" button 120. In response the program executes a step at 920 by retrieving from the media-element database, stored in the control interface 200, the media elements comprising the service. For example, if the user selects the "help" service 912, the program retrieves the help application media elements and transmits them for display on the user's television.

Alternatively, if the user wishes to use the movie finder application 913, the program retrieves media elements 907 from the media-element database 906 for display on the user's television. These media elements correspond to the text-driven search elements depicted in FIG. 7. As the user enters letters using compass buttons 131–133 and the "choice"110 button, the movie finder 915 service executes steps at 931–933 and 910. These steps provide screen updates for display on the user's television as each letter is entered in the title entry window 513. The screen updates created at step 921 comprise a new letter in the title entry window 513 and an updated list in the title display window 512 showing only the movies having titles with the entered letter sequence shown. The control interface then provides screen updates by executing a step shown at 922.

If the user desires to see preview material, the user enters a "select" command which the program detects at step 920. The program then makes a transition to the pictorial search system by entering the browse feature at 945. If the user had preferred, the user could have entered the browse feature at step 940 immediately after connecting to the service.

Whether the user enters the pictorial search system from the movie finder service, or immediately upon entering the service, the program first must execute steps 941–944 to determine which four icons will be displayed. If the user is entering from the movie finder service, the user has already selected one of the icons that will be displayed. Step 943 would then comprise identifying the three adjacent titles within the virtual grid shown in FIG. 10. Once these have been identified, the appropriate media elements 942 are recalled from media-element database 941. Since the user has indicated by the "select" key entry that the user desires to view preview material, the final step consists of displaying preview material using the display shown in FIG. 13. Alternatively, if the user enters the pictorial search system immediately, step 943 would comprise a default routine in which four predetermined icons would be selected for display using the screen shown in FIG. 9.

The program then receives commands from the user generated by the "choice," "select" and "compass" buttons shown as 910, 920, and 930–933. After each of these commands, the program executes steps 941–943 to display appropriate media elements. For example, if the user is dissatisfied with currently displayed pictorial icons, by pressing one of the "compass" buttons 130–133, one of the steps at 930–933 would be executed. Either four new icons would be displayed from a new category, or two new icons from the same category would be displayed.

By pressing the "choice" button 110 the user generates another command signal and the program provides screen updates corresponding to the highlighting animation sequences using media elements 906 retrieved from the media-element database.

Assuming the user locates a movie of interest, the program would execute step 945 to display preview material using the display shown in FIG. 13. If after viewing the preview material the movie continues to be of interest, the user enters another "select" key stroke at 920 and the program executes step 946 to poll the user for payment information using the screen shown in FIG. 14. After a final "select" keystroke the program executes step 947 to display the movie.

2. Further Details of this Invention

A more detailed description of the computer software that implements the preferred embodiment is depicted in the flowcharts shown in FIGS. 16–21. After the user indicates the user's preference to use the screen menu at step 2220 called "where mode other services," the program then executes a number of steps in order to display the screen menu depicted in FIG. 5. The program does this at 2230 by retrieving media elements corresponding to the screen menu. The program then executes a push transition at step 2240. A push transition includes a standardized animation sequence that causes the old media elements currently being displayed to be replaced by new media elements. The push transition 2240 executed by the program causes the new media elements to be displayed at 2250. Conventional multimedia computer languages offer preprogrammed subroutines that make the programming of such animation sequences straightforward to one of ordinary skill in the art. After the screen menu screen has been displayed, the program enters a wait state waiting for a key press by the user.

When the user presses the "choice" key, at 2260, the program executes a series of steps to perform the "highlight" function. These steps generate a new screen for display on the user's television 15. Before highlighting a particular icon, the program execute step 2270 called the "which sprite" routine to determine if an icon (or sprite) is currently highlighted. If the user has just entered the screen menu, no icon would be highlighted, and the program would highlight the preferences icon 314 first. If an icon has been highlighted, then the program must determine the next icon in a clockwise sequence at step 2280. The program then replaces the old filename of the icon currently highlighted with the filename of the next icon to be highlighted at step 2290. The media elements comprising the new display are then retrieved at step 2300 and displayed at step 2310. As indicated in the preceding description, the highlighting of each icon corresponds to a standardized animation sequence. First, the highlighted icon grows to occupy a larger portion of the screen. Second, the non-highlighted icons shrink in size to occupy a smaller portion of the screen. Third, the background and non-highlighted icons convert to black and white. Steps 2270–2310 are repeated each time the user depresses the "choice" key. As a result, each of the four pictorial icons are sequentially highlighted on the television screen.

If the user wishes to use one of the services, the user can press the "select" key shown at step 2315. The program will then call up the media elements corresponding to the highlighted service. These will be displayed on the television, and the program will wait for keypad entries.

The other services available will now be described. The "coming soon" 2330 service corresponds to a prerecorded video of movie previews of titles soon to be added to the video-on-database. If the user selects this service a number of program steps are executed at 2330, resulting in the display of the "coming soon" video on the user's television.

"Help" is another available service. This is accessed by the user when the user "highlights" the "help" icon and then "selects" it. When the program detects these commands it retrieves the help video at step 2340 and displays it on the user's television.

The next service is called "preferences" and may comprise several options for customizing the service to the user's needs. For example, the user could select a parental lock-out feature. Alternatively, the user could enter a preprogrammed payment scheme. Finally, the user could limit future searches to specific categories by eliminating certain categories of titles.

In order to accommodate user preferences, the service can be tailored to provide features based on preference. For example, the user may be provided with a capability to specify the particular categories the user wishes to search in advance of the browse function. Similarly, a user may be provided with a capability to delete categories. If the user does not prefer "westerns", this category could be deleted from the search protocol and navigator icon and the user would not be presented with offerings from this category.

Another preference function may not require a user to actively select or delete categories for search, but may be activated by the user with the preferences feature. After a period of viewing, the system will detect viewing habits and reflect them in the media-element database. The preference routine will present only a subset of selections. For instance, if the user's viewing habits indicate that he has only viewed comedies and westerns, then following the selection of the "preference" function the user will only be presented with the "western" and "comedy" categories to be searched.

Movie finder service 2320, a text-driven search scheme which complements the icon-driven search, has been described above. When the movie finder service is selected at step 2320 by a "select" keystroke at 2315, the appropriate media elements are retrieved by the program, a push transition is executed, and the new media elements are displayed on the screen, all executed at step 2360 in FIG. 17. These media elements are three in number—a virtual keyboard 511, a title entry window 513, and a title display window 512; these elements are depicted in FIG. 7. Using the compass keys 131–133 and "choice" key 110, the user highlights letters on the keyboard, shown as steps 2370–2380. As each letter is highlighted by the user, the program generates a new screen for display on the user's television. The new screens depict the letters entered by the user in the title entry window 513. As letters are entered, the program displays in the title display window all the movies having a title starting with the letter sequence entered by the user. The program accomplishes this by searching the movie database at 2390 for the appropriate movies. As letters are entered, the service provides a series of screen updates 2400 as shown in FIGS. 8A–C.

Once a letter has been entered, the user can switch to the title display window to continue the search. The user accomplishes this by pressing the "north" button 130. The program detects this at step 2410 and provides the appropriate screen updates showing to the user that the user is now searching titles in the title display window. The user can employ the title display window to choose movies for review and possible selection. When the user is in the title display window, the user can use the "north" and "south" keys to move up and down the list alphabetically as shown as step 2425. After each depressing of the "north" and "south" keys the program moves a light bar 514 over the movie listed above or below the last highlighted movie. If the user desires to see preview material associated with the particular movie being highlighted, the user can press the "select" button at step 2430.

When the program detects the "select" keystroke it makes a transition to another program segment that implements the searching of the movie database. This portion of the program displays the icon of the movie currently highlighted in the title display window and three other icons in the same subject matter category corresponding to the offerings with titles that are alphabetically closest to the originally highlighted movie.

This process starts when the program updates the icon to be highlighted in the next screen at step 2440 by retrieving the filename of the movie that the user has selected. The next step, called "determine grid," occurs at 2840 in FIG. 18, and controls display of the icons corresponding to the highlighted movie and the adjacent movies. "Determine grid" 2840 calls up the movie database as shown as step 2870 to determine which three movies have titles that are alphabetically adjacent to the highlighted movie and makes a list comprised of these three movies and the highlighted movie at step 2880. The pictorial icons corresponding to the four movies are retrieved as shown at step 2890.

Media elements corresponding to the background are retrieved at step 2820. At the same time the navigator icon has to be updated for display. This consists of determining the category in which the highlighted movie appears, and also the location of the movie within the alphabet at step 2850. Once these are determined by the program, the appropriate media elements ate obtained, including a sequence in which the navigator icon simulates rotation to a new position. In the last step at 2910 a push transition is executed and the new media elements (the four icons, an updated navigator icon animation sequence and background) are displayed.

Instead of entering the pictorial search of the movie database through the movie finder option, the user could have entered the pictorial search feature immediately upon connecting to the service. Whether the user enters the database search through the movie finder option, or immediately upon connecting to the service, the operation of the pictorial search feature is virtually the same, except that preview material is played immediately for the selected title if the user enters from the movie finder option. If the user enters the database search immediately upon connecting to the service at step 2500 in FIG. 19, the program would execute steps starting at 2830 to determine four default icons to be displayed to start the search and also to generate the other media elements comprising the screen depicted in FIG. 9 including the background and navigator icon.

If the user is just entering the feature, the program executes the steps starting at 2810. In other words, the program calls up the media elements corresponding to the background, the initial four icons and the navigator icon. The program executes the step shown by 2820 to call up the background. The program also determines the first four icons to be displayed starting at determine grid 2840. The program accomplishes this by retrieving the four default movie offerings from the movie database at 2910. Once the program has retrieved the four movie names as indicated at step 2920, it then proceeds to call up the media elements or pictorial icons associated with the movies. In addition, it is also necessary for the program to initialize the navigator icon for display, shown as starting at step 2850. Based on the default movies chosen, the program determines the category to be highlighted in the center of the navigator icon and also the alphabet location to be depicted on the icon. Once the background, four icons and navigator icon are selected they are displayed on the user's television at step 2910.

Once the icons are displayed on the screen, the user can start browsing through the offerings. As the user presses the "choice" key 2730, the program executes the steps which highlight the icons shown starting at 2740. The program determines which icon to highlight starting at 2750. The filename of the icon to be highlighted is retrieved at step 2750 and the icon is replaced with the updated file name at step 2760. After each "choice" keystroke entered by the user the program increments the "which sprite" count. If it reaches four, the count is reset to one at step 2780. Once it is determined which icon is to be highlighted, the appropriate media elements are retrieved at step 2790 and displayed at 2800.

Figure 18:
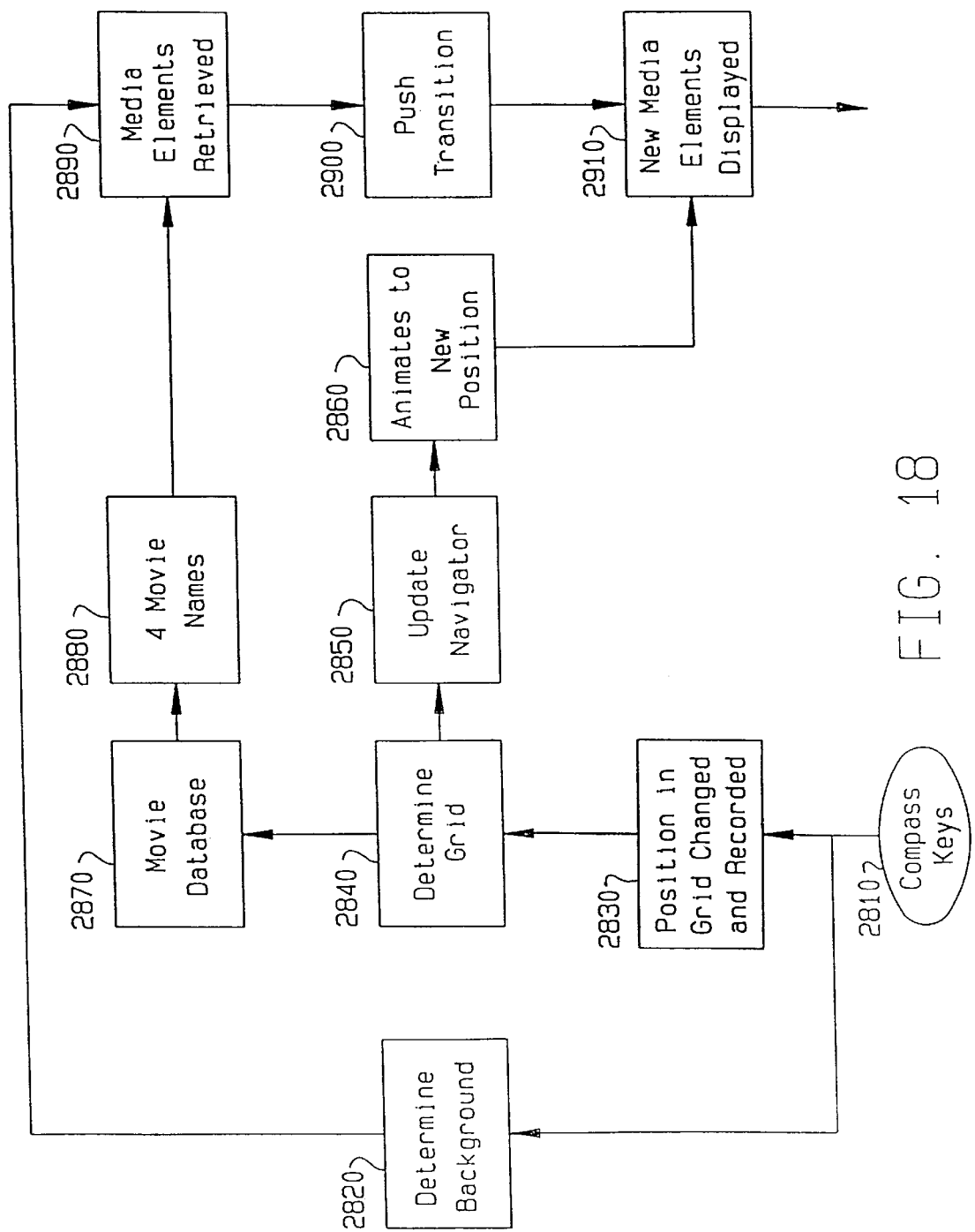
FIG. 18 is a flowchart depicting in detail the programming steps executed by a computer so as to create the display of FIG. 9.

If after viewing the four currently displayed icons none appear to be of interest, the user will press the compass keys 130–133 shown at step 2810 in FIG. 18. If the user presses the "north" or "south" keys four new icons are displayed from a different category at steps 2830–2890. In making transitions between categories, the program ensures that the movies displayed in the new category will have titles starting with the same letters as the titles in the previous category. If the user presses the "east" or "west" keys and thereby remains in the same category, two new icons will be displayed in addition to two previous icons.

Figure 19:
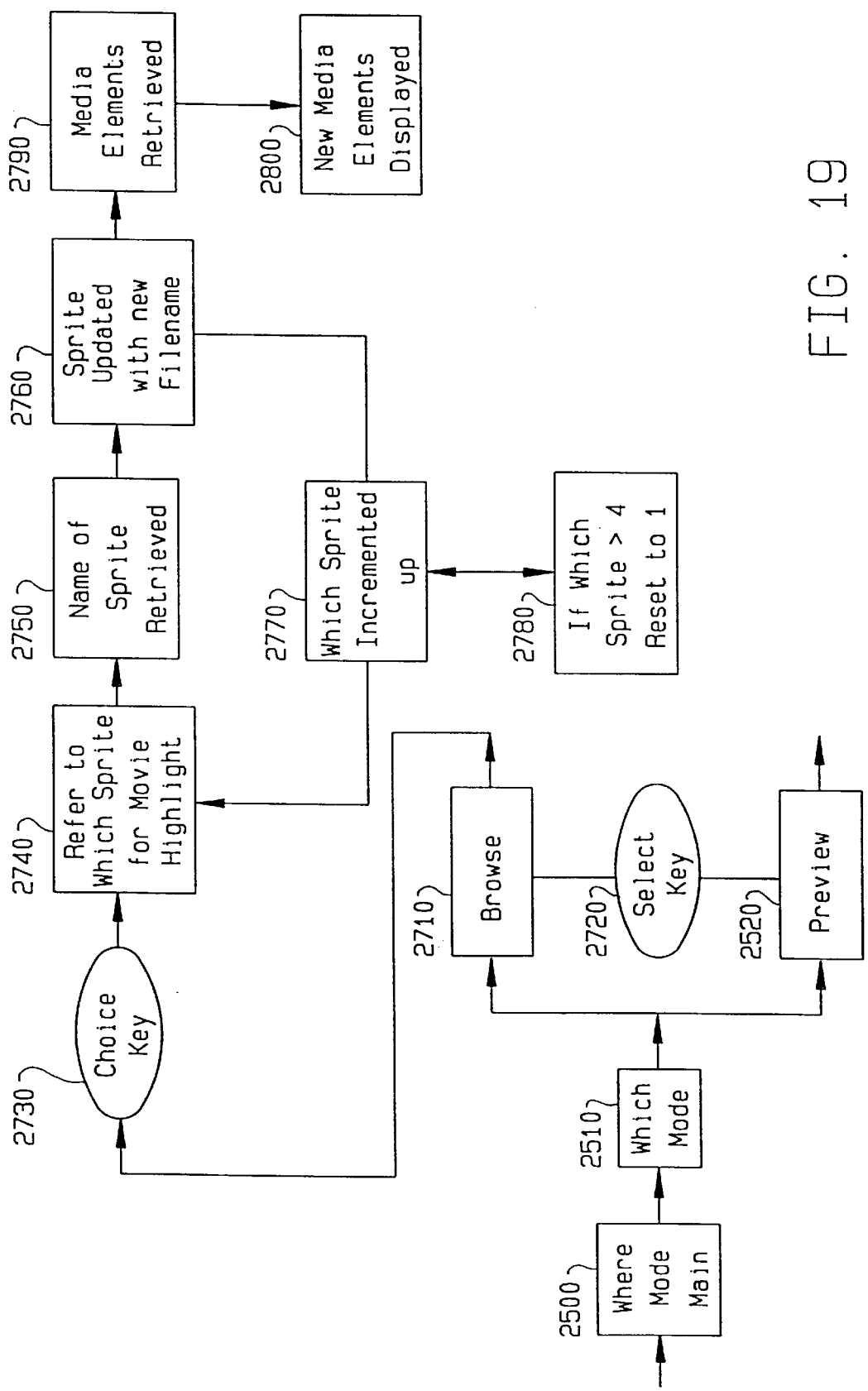
FIG. 19 is a flowchart depicting in detail the programming steps that implement the pictorial search feature of the preferred embodiment.
Figure 20:
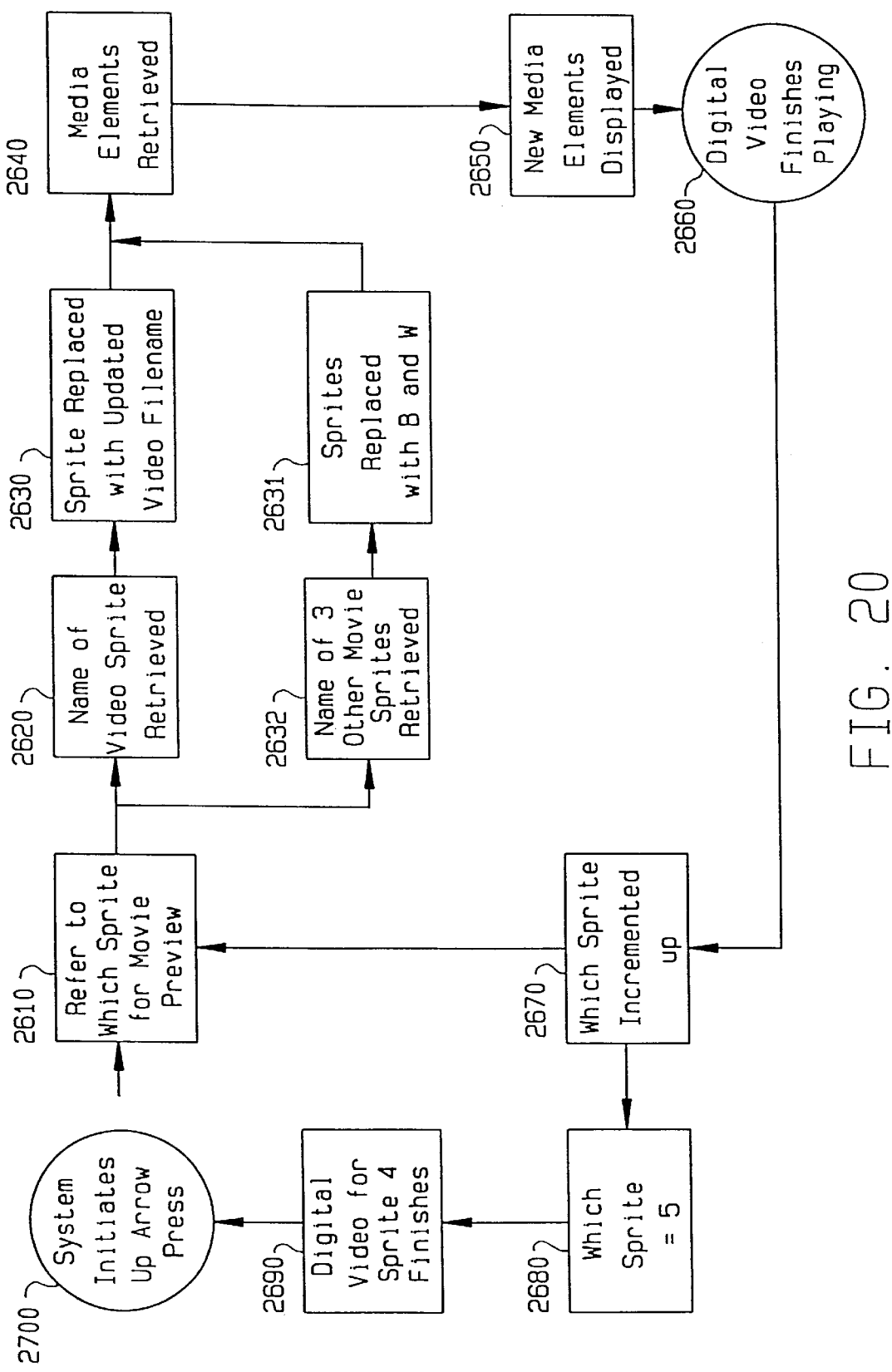
FIG. 20 is a flowchart depicting in detail the programming steps that implement the playback of preview information.
Figure 21:
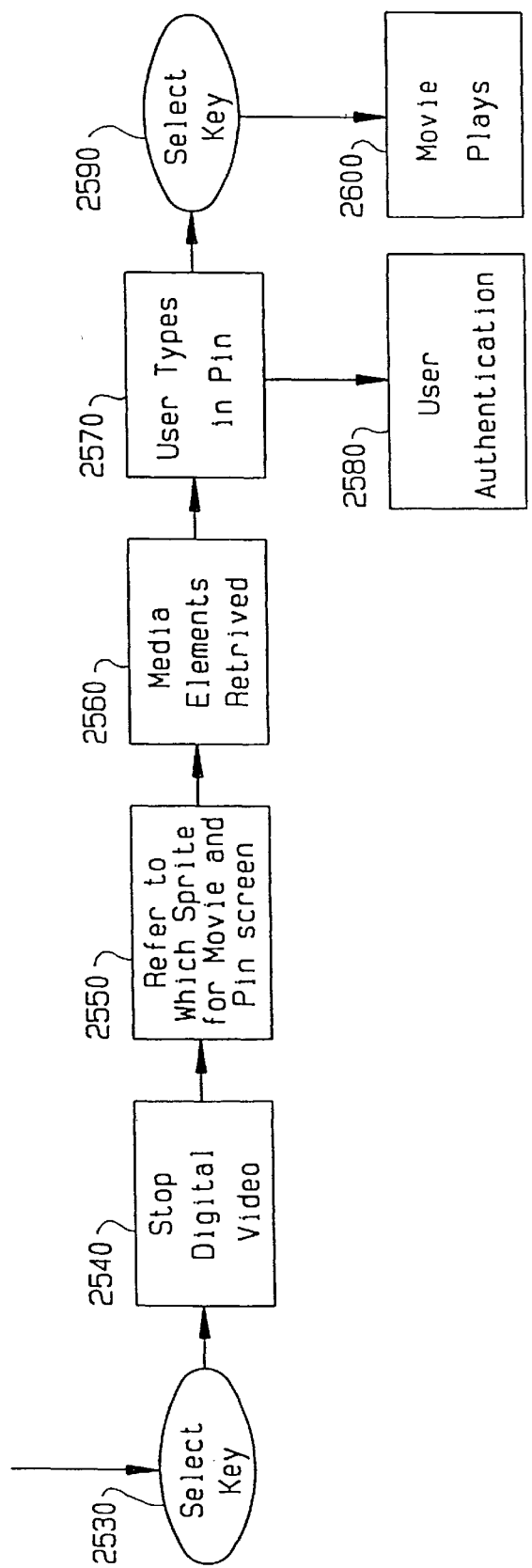
FIG. 21 is a flowchart depicting in detail the programming steps that implement playback of a video offering.

Once the user has highlighted a movie that appears of interest, the user can view preview material associated with that movie by pressing the "select" key at step 2730 in FIG. 19. When the program detects the select keystroke, it executes a series of steps starting at 2520. These steps are continued in FIG. 20. First, the program executes the "which sprite" routine at 2610 to determine the filename of the icon (or sprite) that is currently highlighted. This comprises retrieving the name of the icon at 2620 and replacing the current icon filename with the new filename. In addition, the program at the same time retrieves the filenames of the three icons that are currently displayed to replace them with a black and white icon at step. The media elements are retrieved at step 2640 and comprise the media elements depicted in FIG. 13, namely, smaller icons 320, 321, and 333, navigator icon 350, the preview video to be displayed in the display window 325. These media elements are displayed on the user television screen at 2650 until the digital video finishes playing at 2660. If the user enters no keystroke after the video finishes playing, the program increments the "which sprite" count up at step 2670. Then the program executes the preview steps 2610–2670 over again to display preview material associated with the movie corresponding to the icon next in the clockwise sequence. This process continues until preview material for all the currently displayed icons have been displayed. If the "which sprite" count is incremented to 5, this will be detected at step 2680. This means that previews have been displayed for all the currently displayed icons. When the program detects that the video for the last icon has ended at 2690, the program itself initiates a "north" arrow key press at step 2200 to display four new icons. This causes steps starting at 2840 in FIG. 18 to be executed to determine which four icons should be displayed next.

If the user determines that the user wishes to view a selected icon, the user may press the "select" key again. The program detects this at step 2350 in FIG. 21.

In response to the "select" key press, the program stops the digital video at step 2540. The program refers to the "which sprite" routine at step 2550 to retrieve the filename of the movie that has been selected, and also retrieves the payment screen depicted in FIG. 14. The user enters her payment preference at 2570 using the "choice" key and "compass" keys. When this is completed, the user enters another "select" keystroke at 2590 and the movie plays at 2600.

Even though this embodiment is by way of example primarily directed to a video-on-demand system, it should be reminded that this invention is not limited to such. The invention may be used for interfacing to local databases, for example, to select movie offerings to be rented at a video store, or for representing information available over computer networks, such as the Internet. The sphere or torus metaphor may help navigate web pages in the Internet, for example, by presenting the available web sites classified in terms of subject areas and titles as a collection of icons organized into a sphere or a torus.

The concept behind navigating a sphere or a torus can also be extended to other 3-dimensional objects as an efficient way to organize and represent information. In the case of a web page or video game, a 3-dimensional object can be made to rotate on its x, y, or z axis to reveal new areas of the object. Associated with each of these areas is new information content available. The user is then able to rotate the object, locate a topic of interest associated with the particular area of the object, and then click on the area to access new information in the form of text, graphics, sound, video, or other media.

The object, for example, may be an automobile. The automobile object is rotated by clicking the screen around the periphery of the object. Areas such as the doors, trunk, and tires are revealed and become active as the automobile object turns. Once an area showing the tires is active, the user can simply click on them to link to the corresponding information. This link may take the user to new information such as tire specification, photos, videos of a road test, or any other relevant information. This interface, of course, can also be helpful in the Internet web page navigation.

It should be apparent to those skilled in the database interface design that the invention can be readily implemented using a relational database management system as a platform. All information entries can be stored in memory in the form of tables of a relational database as known in the art. Many relational database management systems are available from commercial vendors such Oracle or Sybase.

Thus, it is seen that a system and method for interactively selecting video offerings is provided. One skilled in the art will appreciate that the present invention can be practiced by other than the described embodiments, which are presented for purposes of illustration and not of limitation, and the present invention is limited only by the claims that follow.

We claim:

1. A method of interactively accessing a database of selections, each such selection being classifiable into at least two categories, such selections being stored in at least one computer-accessible storage, comprising the steps of:

representing at least a portion of the database with a geometric object corresponding to a virtual space having logical coordinates in at least two dimensions, wherein each selection is assigned to a point on the logical coordinates in accordance with its categories; and displaying on a monitor pictorial icons representing at least some of the selection s stored in the database in accordance with the logical coordinates of the selections.

2. The method of claim 1, further comprising displaying a navigator icon for identifying a location in the virtual space of the selections represented by pictorial icons.

3. The method of claim 2, wherein the navigator icon is animated to operate in synchronism with user's inputs.

4. The method of claim 1, wherein the geometric object is a three-dimensional structure.

5. The method of claim 1, wherein the geometric object is a globe.

6. The method of claim 5, wherein the selections are organized as arrayed on the globe alphabetically by title along lines of longitude and by subject category along lines of latitude.

7. The method of claim 6, wherein the pictorial icons for the selections are displayed such that selections having titles starting with the same letter of the alphabet are displayed as a user makes a transition from one subject category to another.

8. The method of claim 1, wherein the geometric object is a torus.

9. The method of claim 8, wherein the selections are organized as arrayed on the torus such that horizontal connections represent subject categories of selections that are positioned alphabetically within each category.

10. The method of claim 1, further comprising entering user input through a remote control.

11. The method of claim 1, wherein the selections are displayed such that a pictorial icon selected by a user is distinguished in appearance from the other pictorial icons.

12. The method of claim 1, further comprising displaying a virtual keyboard on the monitor for the user to enter alphanumeric information.

13. The method of claim 1, wherein the selections include movies.

14. The method of claim 1, further comprising displaying a subset of selections according to the user's preference.

15. The method of claim 1, wherein the monitor is a television.

16. The method of claim 1, wherein the monitor is a computer monitor.

17. A method of interactively accessing a remotely located database of selections, each such selection being classifiable into at least two categories, such selections being stored in at least one computer-accessible storage, comprising the steps of:

establishing a communication between a user and the remotely located database;

representing at least a portion of the database with a geometric object corresponding to a virtual space having logical coordinates, wherein each selection is assigned to a point on the logical coordinates in accordance with its categories; and displaying on a monitor pictorial icons representing at least some of the selections stored in the database in accordance with the logical coordinates of the selections.

18. The method of claim 17, wherein the selections include movies.

19. The method of claim 17, wherein the geometric object is a globe.

20. The method of claim 17, wherein the geometric object is a torus.

21. The method of claim 17, wherein the pictorial icons further include a navigator icon for identifying a location in the virtual space corresponding to the displayed pictorial icon.

22. The method of claim 17, wherein the user and the remotely located database are connected to a computer network.

23. The method of claim 22, wherein the computer network is the Internet.

24. A system for interactively accessing a selection from a database of selections, comprising:

a database machine for storing database in a storage and for searching and retrieving a selection from the database;

a controller for accepting an input from a user and for sending signals to a monitor; and a control interface for interfacing the database machine and the controller by generating signals for pictorial icons as arranged on a geometric object representing a virtual space having logical coordinates in at least two dimensions, where each selection is assigned to a point on the logical coordinates in accordance with its classifications.

25. The system of claim 24, further including a remote control unit through which a user enters an input.

26. The system of claim 24, further including a switching means through which the controller communicates with the database machine.

27. The system of claim 24, wherein the control interface further includes means for generating signals for a navigator icon for identifying a location in the virtual space corresponding to the displayed pictorial icon.

28. The system of claim 24, wherein in the control interface further includes means for generating signals for an animation sequence of the navigator icon in synchronism with user's searching pattern.

29. The system of claim 24, wherein the control interface further includes means for generating signals for the virtual space as a multi-dimensional structure having at least two dimensions with one dimension representing subject categories and the other dimension representing selection titles.

30. The system of claim 24, wherein the control interface further includes means for generating signals for pictorial icons arrayed on a globe alphabetically by title along lines of longitude and by subject category along lines of latitude.

31. The system of claim 30, wherein the control interface generates pictorial icons for selections in the virtual space such that selections having titles starting with letters from the same letter of the alphabet are displayed as a user makes a transition from one subject category to another.

32. The system of claim 24, wherein the control interface further includes means for generating pictorial icons arrayed on a torus such that horizontal connections represent subject categories of selections alphabetically within each category.

33. The system of claim 32, wherein the control interface generates pictorial icons for selections in the virtual space such that selections having titles starting with letters from the same letter of the alphabet are displayed as a user makes a transition from one subject category to another.

34. The system of claim 24, wherein the control interface further including means for generating signals for displaying a virtual keyboard whereby the user can enter alphanumeric information.

35. A system for interactively accessing a selection from a remotely located database of selections by a user viewing a monitor, comprising:

a database machine for storing database in a storage and for searching and retrieving a selection from the database;

a controller for processing input from a user; and a control interface connecting both the database machine and the controller for generating and transmitting signals for a geometric representation of a virtual space having logical coordinates in at least two dimensions, where each selection is assigned to a point on the logical coordinates in accordance with its classifications.

36. The system of claim 35, further including switching means through which the controller communicates with the database machine.

37. The system of claim 35, wherein the control interface further includes means for generating signals representing the virtual space shown as a globe.

38. The system of claim 35, wherein the control interface further includes means for generating signals representing the virtual space shown as a torus.

39. The system of claim 35, wherein the control interface further includes means for generating signals for a navigator icon for identifying a location in the virtual space corresponding to the displayed pictorial icon.

40. The system of claim 35, further comprising a network interface to a computer network connecting the system and the remotely located database.

41. The system of claim 40, wherein the computer network is the Internet.

* * * * *